May 21, 1940.                M. SAINICH                2,201,505
                          LATHE ATTACHMENT
                        Filed June 14, 1939           2 Sheets-Sheet 1
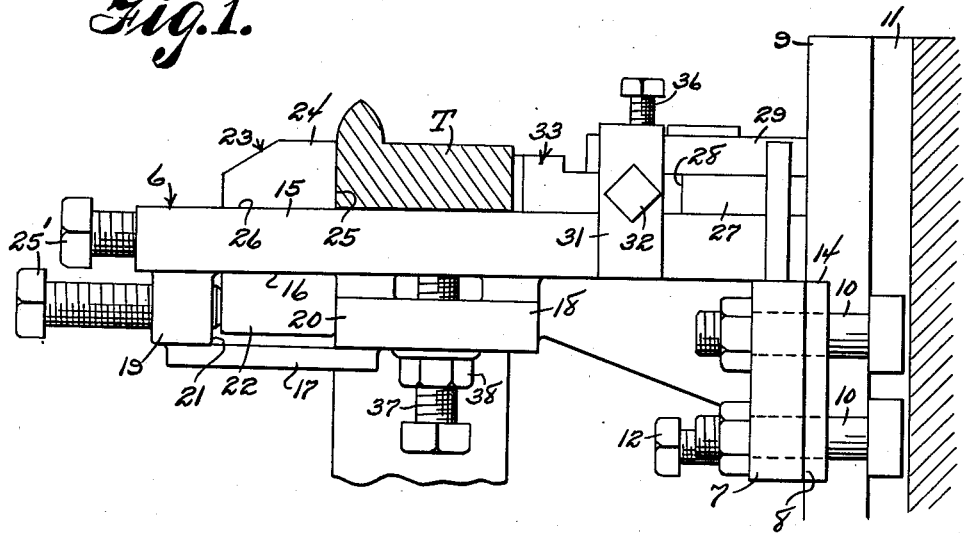
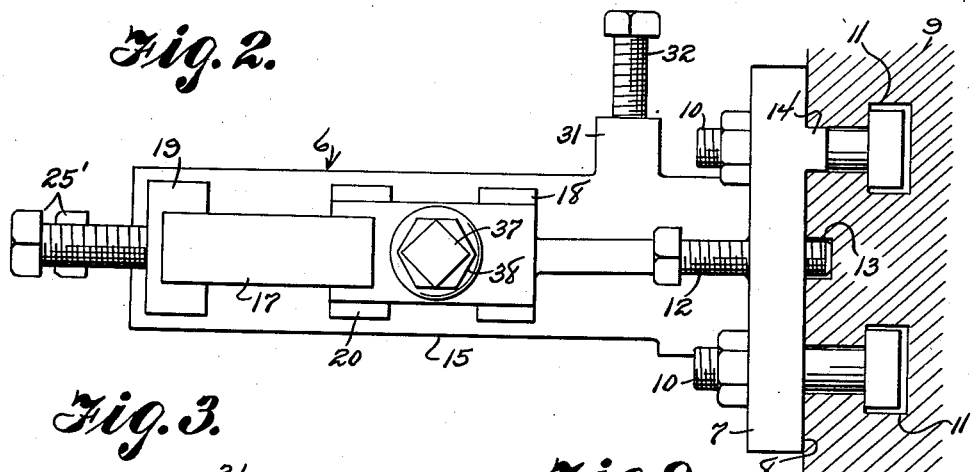
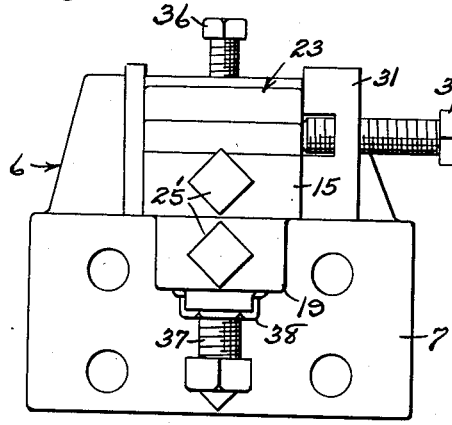
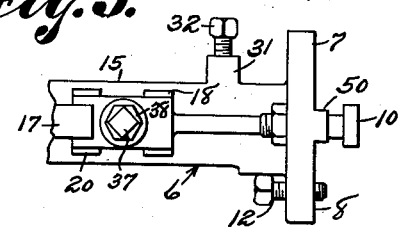
Martin Sainich
INVENTOR
BY Victor J. Evans & Co.
ATTORNEYS May 21, 1940.  M. SAINICH  2,201,505
LATHE ATTACHMENT
Filed June 14, 1939  2 Sheets-Sheet 2
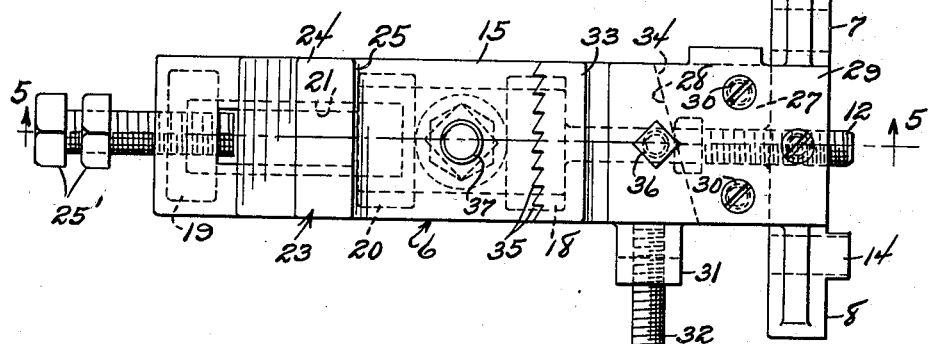
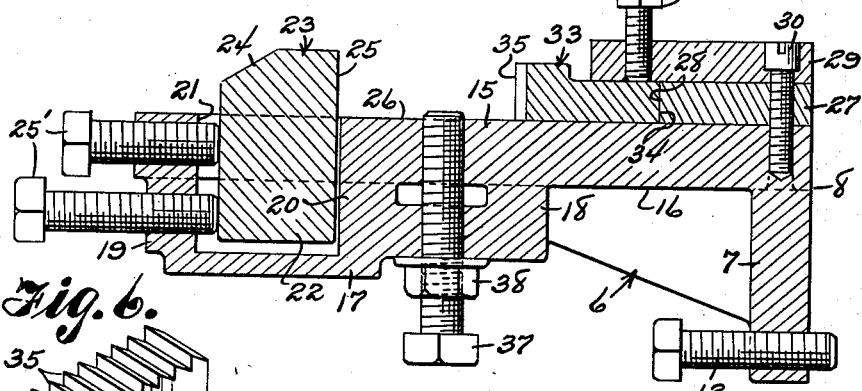
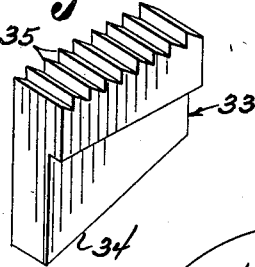
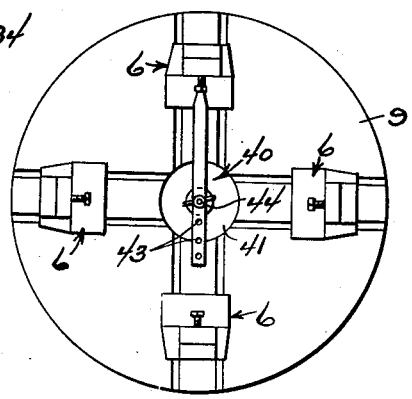
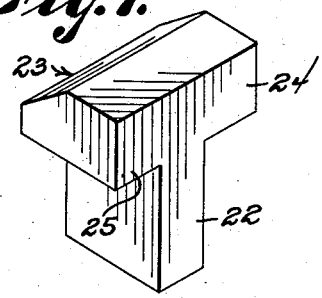
Martin Sainich
INVENTOR
BY Victor J. Evans & Co.
ATTORNEYS Patented May 21, 1940

2,201,505

UNITED STATES PATENT OFFICE 2,201,505

LATHE ATTACHMENT

Martin Sainich, Livingston, Mont.

Application June 14, 1939, Serial No. 279,199

2 Claims. (Cl. 82—40)

My invention relates to improvements in lathe attachments and has as one of the principal objects thereof the provision of a lathe attachment capable of being attached to the face-plate of a lathe or boring mill and which is so constructed and arranged as to effectively grip the sides of a wheel tire at different points around the circumferential side faces thereof to rigidly hold the tire in a desired position on the face-plate for turning.

Another object of my invention is to provide an attachment of the above described character which is simple in construction, durable in use, efficient in operation, easy of attachment to a lathe and economical in manufacture.

Other objects and advantages will be apparent from the following description, appended claims and annexed drawings.

Referring to the drawings wherein like reference characters designate like parts throughout the several views:

Figure 1 is a side elevation of one of the units or brackets comprising my invention, a section of a tire being illustrated in association therewith.

Figure 2 is a bottom plan view of the unit.

Figure 3 is a front elevation thereof.

Figure 4 is a top plan view of the unit.

Figure 5 is a sectional view taken on the line 5—5 of Figure 4.

Figure 6 is a detail perspective view of the wedging dog.

Figure 7 is a detail perspective view of the adjustable stop.

Figure 8 is a front elevation of the face-plate of a lathe illustrating my invention attached thereto.

Figure 9 is a fragmentary bottom plan view of a modified form.

In the preferred embodiment of my invention, as illustrated in Figures 1 to 8 inclusive of the drawings, I provide a plurality of spaced units or brackets 6 and inasmuch as each of said units are of a like construction, a detailed description of one will suffice, it being understood that reference characters indicative of the parts of one unit are indicative of like parts of the other units.

Each of the brackets or units are fashioned with a base section 7 having a rear face 8 abutting the outer face of a face-plate 9 of a lathe. Said section 7 is secured to said face-plate 9 by means of bolts 10 extending therethrough, the heads of said bolts being disposed in the inner portion of T-shaped slots 11 formed in the face-plate as clearly illustrated in Figures 1 and 2 of the drawings.

The outer ends of the bolts 10 extend beyond the outer face of the section 7 and are provided with nuts whereby the section 7 is clamped to the face-plate. Between the bolts 10, the section 7 has threaded therethrough a bolt 12 seated within a socket 13 formed in the face-plate between the slots 11 whereby to maintain said bracket in adjusted position therewith. Furthermore, the rear face of the section 7 is formed with a projection 14 fitting one of the channels or outer portions communicating with the inner portions of the slots 11 to preclude lateral movement of the bracket relative to said slots.

One end of the section 7 of the bracket is formed with a right angularly disposed arm 15, the latter being fashioned on the under face 16 thereof with a yoke 17. The yoke 17 is formed with inner and outer end and intermediate portions 18, 19 and 20 respectively integrally connecting the yoke to the arm 15 as clearly depicted in Figure 5 of the drawings.

The arm, between the portions 19 and 20, is formed with a slot 21 through which extends the shank 22 of a detachable stop 23, the latter being provided with a head 24 overlying the arm and slidable relative thereto. The head 24 is formed with a wall 25 right angularly disposed relative to the upper face 26 of the arm 15 and serves to engage one circumferential side of a tire T as illustrated in Figure 1 and for a purpose hereinafter described. The outer end of the arm 15 and the outer end portion 19 of the yoke are provided with bolts 25' for clamping the shank 22 of the stop 23 against the portion 20 and one of the walls defining the slot 21.

The upper face 26 of the arm 15, adjacent the section 7, is provided with a block 27, the latter being fashioned with an angled face 28 oppositely disposed from the stop 23. Mounted on the block 27 is a guide member 29, the latter having a portion overlying and extending beyond the angled face 28 of said block. Bolts 30 extend through the guide member and block and secure them to the arm 15.

Fixed to the sides of the guide member 29 and arm 15 are right angularly disposed ends of a bridge member 31, the latter being provided with a bolt 32 for engagement with a dog 33 arranged on the upper face 26 of the arm 15 between the latter and the guide member 29 for adjustment relative thereto. On one side, the dog is provided with an angled face 34 for sliding engagement with the angled face 28 of the block 27 and on the opposite side with teeth 35 for engagement with the tire T whereby to clamp the latter against the stop 23. The guide member 29 has mounted therein a bolt 36 for clamping the dog 33 to the arm as hereinafter set forth.

Between the portions 18 and 20 the yoke has threaded therethrough a bolt 37 which extends upwardly through the arm 15 for engagement with the inner circumferential face of the tire T whereby to effect adjustment of the tire relative to the center of the face-plate 9. The bolt 37, adjacent the yoke 17, is provided with a lock nut 38 whereby to maintain said bolt in adjusted position.

In operation, the units 6 being assembled on the face-plate 9 as illustrated in Figure 8 of the drawings, the respective stops 23 are removed from said units and a tire disposed over the arms 15 in a direction from the outer ends of the arms. When a tire is thus disposed about the arms, the stops 23 are mounted in the slots 21 and clamped to the arms by means of the bolts 25. When the parts are thus assembled, the bolts 37 are manipulated to effect adjustment of the tire relative to the center of the face-plate 9.

In order to effect an accurate adjustment of the tire relative to the face-plate 9 I employ a gauge 40 comprising a block 41 secured to the face-plate and on which is mounted a swingable arm 42, the outer end of which is adapted to register with the outer faces of the heads of the bolts 37 whereby said bolts are each adjusted the same distance within the arm 15, thereby effecting adjustment of the tire with respect to the face-plate 9. The arm 42 is provided with a plurality of apertures 43 for receiving the pivot 44 carried by the block 41 whereby the outer end of the arm 42 may be adjusted relative to the pivot 44 depending on the circumference of the tire T. When the tire T is thus adjusted on the arms 15 and against the stops 23, the dogs 33 are moved relative to the blocks 27 to effect engagement of the teeth 35 with the opposite side of the tire and to clamp the latter against the stops 23.

When the dogs are thus adjusted by means of the bolts 32, the bolts 36 are operated to maintain the dogs in said adjusted and clamped condition whereupon the face-plate may be rotated and the tire worked upon. A reverse of the foregoing operation serves to permit removal of the tire from the brackets.

In the modification illustrated in Figure 9 of the drawings, the base sections 7 are each provided with a centrally disposed projection or rib 50 for insertion within the outer portion of one of the slots of a face-plate, the latter being of the type provided with radially extending slots as distinguished from that of the preferred form wherein pairs of slots are provided for receiving the bolts 10.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claims.

What I claim is:

1. In a device of the character described, a plurality of spaced brackets adapted for attachment to the face-plate of a lathe for securing a tire to the latter, each of said brackets provided with an arm fashioned with a slot, a detachable stop carried by said arm and having a shank extending in said slot, a dog slidably mounted on said arm and operable for clamping a tire against said slot and to said arm, and means for clamping said dog to said arm to maintain said dog in engagement with said tire and in fixed position relative to said stop.

2. In a device of the character described, a plurality of spaced brackets adapted for attachment to the face-plate of a lathe for securing a tire to the latter, each of said brackets provided with an arm fashioned with a slot, a detachable stop carried by said arm and having a shank extending in said slot, a dog slidably mounted on said arm and operable for clamping a tire against said slot and to said arm, means for clamping said dog to said arm to maintain said dog in engagement with said tire and in fixed position relative to said stop, and means carried by said arm for adjusting said tire relative to said arm.

MARTIN SAINICH.